United States Patent [19]

Rabe

[11] Patent Number: 5,688,054

[45] Date of Patent: Nov. 18, 1997

[54] PROCESS FOR THE PRODUCTION OF A SLEEVE-SHAPED FRICTION BEARING AND A FRICTION BEARING PRODUCED ACCORDING TO THIS PROCESS

[76] Inventor: Thore Rabe, D-91315 Höchstadt/Aisch, Germany

[21] Appl. No.: 318,652

[22] Filed: Oct. 11, 1994

[30] Foreign Application Priority Data

Apr. 9, 1992 [DE] Germany .................... 42 11 917.0

[51] Int. Cl.$^6$ ................................... F16C 33/04
[52] U.S. Cl. .................. 384/295; 384/296; 29/898.055; 29/898.059
[58] Field of Search ................... 384/280, 281, 384/295, 297, 299, 300, 906, 296; 29/898.055, 898.059

[56] References Cited

U.S. PATENT DOCUMENTS 3,400,988  9/1968  Hudson .

FOREIGN PATENT DOCUMENTS 1449103  7/1966  France .
2079867  1/1982  United Kingdom .

*Primary Examiner*—Lenard A. Footland
*Attorney, Agent, or Firm*—Sixbey, Friedman, Leedom & Ferguson, P.C.; David S. Safran

[57] ABSTRACT

A process for the production of a sleeve shaped friction bearing including the steps of producing a thin inner sliding layer of a polymeric material free of abrasive fillers on a core by a molding process, producing a longitudinal interruption in an outer surface of the sliding layer from one end to another, and sheathing the inner sliding layer with an outside support of another polymeric material and joining the inner layer with the outside support by filling the interruption.

16 Claims, 2 Drawing Sheets

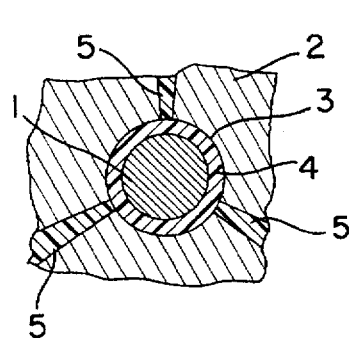
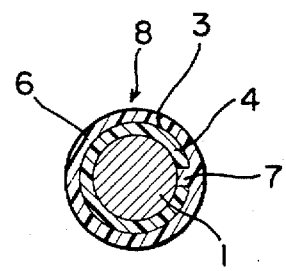
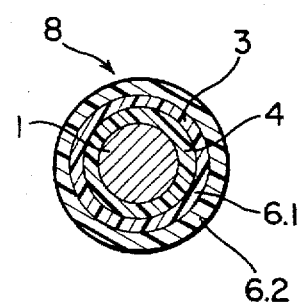
FIG.1  FIG.2  FIG.3
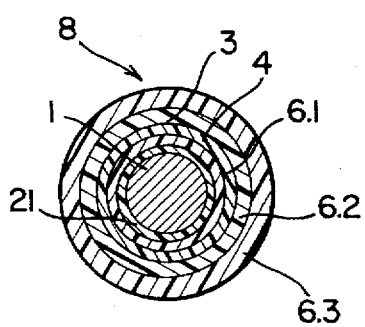
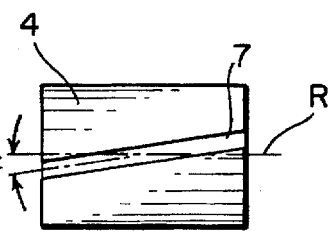
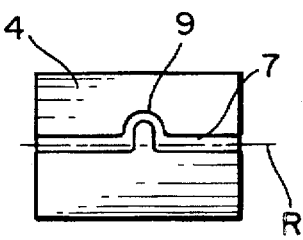
FIG.4  FIG.5  FIG.6
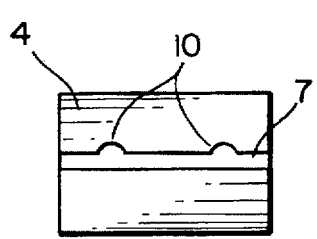
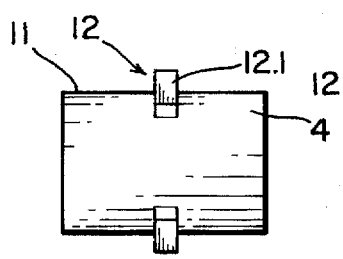
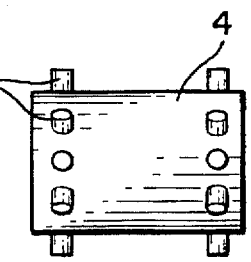
FIG.7  FIG.8  FIG.9
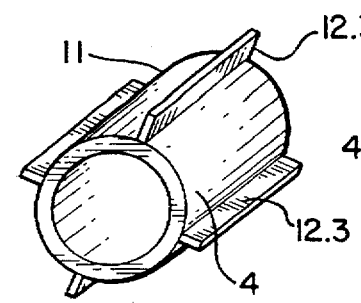
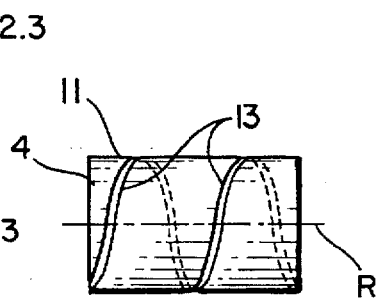
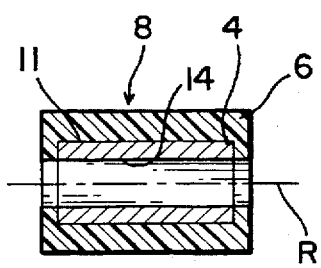
FIG.10  FIG.11  FIG.12

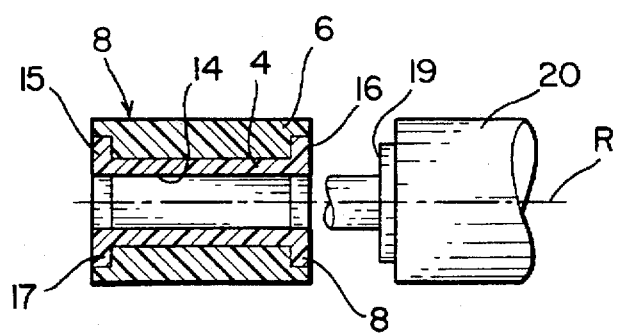
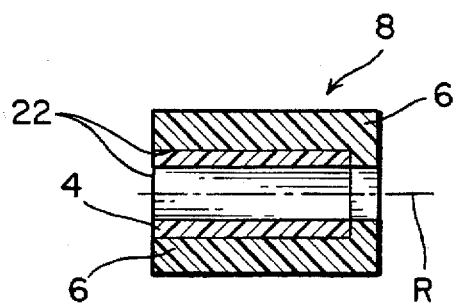
FIG. 13    FIG. 14
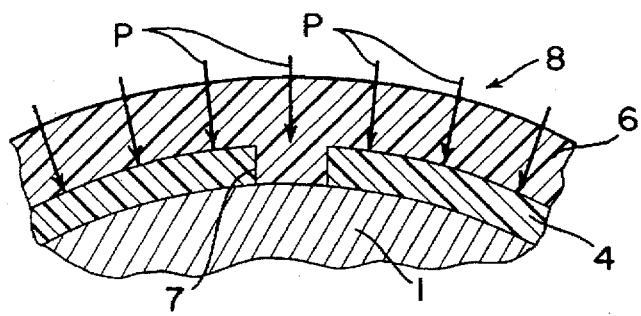
FIG. 15
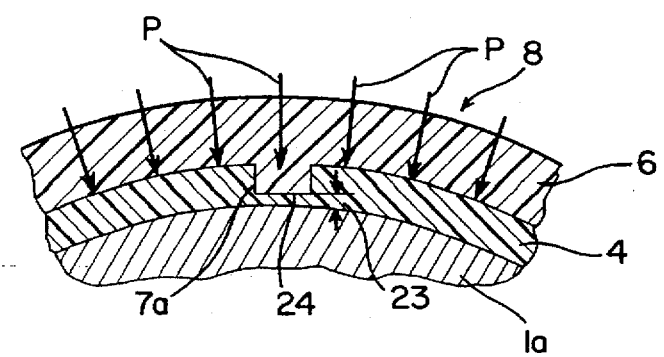
FIG. 16

PROCESS FOR THE PRODUCTION OF A SLEEVE-SHAPED FRICTION BEARING AND A FRICTION BEARING PRODUCED ACCORDING TO THIS PROCESS

BACKGROUND OF THE INVENTION

This invention relates to a process for the production of a sleeve-shaped friction bearing and to a friction bearing produced according to this process.

DESCRIPTION OF RELATED ART

Such a friction beating is known from U.S. Pat. No. 3,008,779. The tubular support consists there of a longitudinally slotted metal sleeve, in which the sliding layer is molded in the form of a thin layer of polyamide or of another synthetic plastic with advantageous sliding properties. In the production of such friction bearings, a very thin gap between the metal sleeve and the injection mandrel must be filled from the front side with the plastic forming the sliding layer. In this connection, the production of very thin sliding layers is especially limited in the case of friction beatings that are longer in axial direction. Especially disadvantageous is that the injected thin friction bearing layer, during cooling, is detached from the coaxial metal sleeve by the material-related shrinkage of the metal sleeve. By the free shrinking-away of the friction bearing layer, the inside diameter of the friction bearing layer also cannot be determined precisely enough.

A similar friction beating is also known from DE-B-1,114,631. There, a first core with a cylindrical matching piece is provided for the production of the bearing housing made of hard polyurethane. For the production of the sliding layer made of softer polyurethane, a second core with smaller outside diameter and an also cylindrical matching piece is provided. Also in this previously known friction beating, the free shrinking-away of the inner friction beating layer cannot be avoided, so that narrow tolerances for a precision friction beating cannot be maintained.

SUMMARY OF THE INVENTION

The object of the invention is consequently to produce a friction bearing of the initially-mentioned type, thus with a plastic sliding layer, cost-effectively and nonpolluting in a simple way and to be able use it with the advantages indicated below. In particular, friction beatings with highest precision can be produced at comparatively low cost.

According to the invention, this object is achieved by the process steps of:

A) producing the thin, inner sliding layer a first polymeric material that is free of abrasive fillers on a core by a molding process;

B) producing at least one longitudinal interruption in an outer surface of the sliding layer which extends from a first axial end to an opposite axial end of the inner sliding layer;

C) sheathing the inner sliding layer with an outside support made of a second polymeric material while said inner sliding layer is on said core and joining the inner sliding layer with the outside support in a manner filling said longitudinal interruption with the second polymeric material of the outside support so as to dimensionally stabilize the sliding layer; and D) pushing the sheathed and dimensionally stabilized sliding layer off of said core and then discarding the core.

The material sprue can also be performed radially by direct injection molding, transfer molding, injection-blow molding or the like of the polymeric sliding layer on a core. As a result, it is possible to produce thin to very thin layers of up to 0.2 mm or even less, also in the case of axially long friction beatings. This results in a considerable cost reduction because of the only small amounts of the generally very expensive polymeric material required for the sliding layer.

The production tolerance of the inside diameter of the friction bearing can be determined simply by suitable selection of the core diameter in light of the small shrinkage allowance of the thin-layer polymer.

Since, in the production of the friction beating according to the invention, one usually gets by with a single injection core, the production can take place on a device with rotary or sliding tables with two or more stations practically in one operation and without special insertions of beating parts.

According to another embodiment of the invention, the insert of a second core with outside diameter changed relative to the first core is provided for the production of the outside support, if the already finished sliding layer is not provided with one or more separating slot(s), but with one or more separating seam(s) and one or more remaining web(s) are provided as webbing or webbings in the area of this/these separating seam(s). This configuration offers the further advantage that the material of the filler-reinforced support does not come in engagement with the shaft and the thickness of the remaining webbing or the remaining webbings can be used as an indication of wear.

By the calibrating and centering function of the material of the support or of the innermost support layer inside the separating gap(s) or the separating seam(s), very narrow tolerances of the inside diameter of the sliding layer in the range $\leq 60$ µm can be achieved.

Further particulars of the invention are described in more detail in the embodiments illustrated in the drawing.

BRIEF DESCRIPTION OF THE DRAWINGS

FIG. 1 is a from view of a friction bearing with a closed sliding layer and with radial sprues;

FIG. 2 is a front cross-sectional view of a friction beating according to this invention with a slotted sliding layer;

FIGS. 3 & 4 are each a cross-sectional view of a respective friction bearing with a multilayered support;

FIGS. 5 to 7 are each a top view of a slotted sliding layer;

FIGS. 8 to 11 show various configurations of sliding layers with moldings provided on the outside surface to achieve an advantageous mold closure between the sliding layer and the support;

FIGS. 12 & 13 each are a view of a friction beating in longitudinal section;

FIG. 14 is a view of another friction bearing in longitudinal section; and

FIGS. 15 & 16 show a cross section of a portion of friction bearings with one or more continuous separating slots or with one or more noncontinuous separating seams.

DETAILED DESCRIPTION OF THE PREFERRED EMBODIMENTS

In FIG. 1 to 4, an injection core is designated in each case with 1. The latter is surrounded by a one-part or multi-part, axially and/or radially movable mold 2. In closed mold 2, a mold cavity 3 for the production of a sleeve-shaped or tubular sliding layer 4 is formed. Radial sprue runners 5 are preferably provided in mold 2.

Mold cavity 3 is configured so that the thickness of sliding layer 4 is about 0.2 mm to 3 mm, especially about 0.3 mm to 2 mm. In the injection-molding, transfer-molding or injection-blow molding process, a thermoplastic or thermosetting deformable plastic with good sliding properties is introduced in mold cavity 3 in a way known in the art, which solidifies or polymerizes there.

Sliding layer 4 is produced preferably from at least one of the polymers, such as polyethersulfone, polyetherketone, polyamide imide or polyetherimide. Sliding layer 4 can contain fillers favorable to sliding in particle, fiber or spherical shape, but such fillers must not have any abrasive properties.

After the polymerization or the solidification of the material of sliding layer 4, this sliding layer 4 still present on core 1 is enclosed with a support 6 made of a hard or flexible polymer. This happens according to one of the molding processes known in plastics technology. In this case, the process is conducted, for example, by using suitable temperature and molding pressures (cavity pressures) and/or the structural configuration of friction bearing 8 is selected so that an integral and/or positive interconnection between sliding layer 4 and support 6 is achieved.

After the polymerization or the solidification of the support material, sheathed friction bearing 8 is pushed off or pulled off from core 1 and then discarded. In this way, a friction bearing 8 with an extremely thin sliding layer 4 can be produced in a simple way, for example, by molding machines with two or more stations.

In the production of a support 6 from hard material, preferably polymers, such as, for example, polybutylene terephthalate (PBTP), polyethylene terephthalate (PETP), polyoxymethylene (POM), polyamide, for example of trade name PA 6 or PA 66, as well as other suitable polymers, are used. Support 6 forms a high-support and optionally also greatly reinforced, very solid layer. For reinforcement, mineral, organic or inorganic fillers in particle, spherical or fiber shape, optionally also mixed with one another, are used. As filling material, for example, glass fibers or fibers made of similar mineral substances or compounds are suitable. Microglass beads with a size of about 10 μm to 100 μm preferably can also be used. Also, particle-shaped fillers made of mineral, organic or inorganic substances can be used in principle.

It is advantageous if a material is used for support 6 or at least for the support intermediate layers 6.1, 6.2 or 6.3 or for one of the support intermediate layers, consisting of hard polymer, which is provided with an approximately 5% to 80% fibrous and/or particle-shaped and/or spherical mineral, organic or inorganic filler portion.

For noise or vibration damping, it can be advantageous to use a flexible polymeric material as support 6 or as one or more of support intermediate layers 6.1, 6.2 or 6.3, for example, based on elastomeric polymers, such as thermoplastic elastomers (TPE), or nitrile-butadiene rubber (NBR) or acrylate rubber (ACM) or silicone rubber (FKM).

Sliding layer 4 has at least one, preferably several continuous longitudinal slot(s) 7, which is or are filled with support material of the support layer lying on top of that, as is represented in FIG. 2. Longitudinal slot(s) 7 is/are arranged at an acute angle to axis of rotation (R), preferably at an angle α between 5° and 30°.

Support 6 can also consist of two or more layers of alternating hard and flexible material or vice versa. In this way, a friction bearing 8 with both good dimensional stability and with high load-bearing capacity, as well as with good damping properties, is obtained. Such a two-layer support 6 is represented in FIG. 3, in which inner layer 6.1 consists of hard or flexible material and outer layer 6.2 consists of flexible or hard material. The conduct of a process is again selected so that an integral and/or positive connection of support-partial layers 6.1 and 6.2 takes place.

FIG. 4 shows a friction bearing 8 with a three-layer support 6 with alternating hard, flexible or hard material or with alternating flexible, hard or flexible material 6.1, 6.2, 6.3. These multiple-layer systems can be produced in a simple way on multistation molding machines with rotary or sliding tables.

In the case of slotted sliding layer 4, longitudinal slot 7—as already mentioned—can run slightly inclined toward axis of rotation R of a shaft or axis whose bearings are to be arranged, as is illustrated by the top view of sliding layer 4 in FIG. 5. Longitudinal slot 7 can be provided according to FIG. 6 with axial, for example, curved offsets 9 or according to FIG. 7 with tangential projections 10 or the like.

On outside surface 11 of sliding layer 4, on-moldings 12, as represented in FIG. 8 and 9, can be molded-on in the form of flange rings or annular sections 12.1 (FIG. 8) or in the form of lugs or webs 12.2 (FIG. 9) or in the form of ribs, for example, longitudinal ribs 12.3 (FIG. 10), which assure a good positive connection.

In addition or instead of on-moldings 12, in-moldings 13, for example, in the form of channels or grooves, can be provided in annular, spiral or other shape, as illustrated in FIG. 11. Fluting or knurls or other indentations can also be provided.

As FIG. 12 shows, sliding layer 4 can advantageously be deformed by material of support 6 up to its sliding surface 14 facing axis of rotation R.

According to an advantageous embodiment of the invention, sliding layer 4 on at least one axial end 15 and/or 16 can comprise a molded-on flange 17 or 18, projecting radially outward, which is not deformed outwardly on the front side by the material of support 6. As a result, a sliding surface, on which, for example, a support surface 19 of a shaft or axis 20 provided with a collar can adjoin in a sliding manner, is obtained on at least one of the axial ends 15 and/or 16.

According to a further embodiment, sliding layer 4 and support 6 or support intermediate layers 6.1, 6.2, 6.3 can be assigned to one another, so that they end flush at least on one axial end 22, as FIG. 14 shows.

The embodiments of FIG. 12 to 14 can be combined with one another at random.

It can be especially advantageous for an optimal lubrication of friction bearing 8, if a sliding layer made of a lubricant-containing or lubricant-bearing polymeric material is used as support 6 coaxially surrounding sliding layer 4 or as support intermediate layer 6.1, 6.2, 6.3 in direct contact at least partially with the surface of sliding layer 4. It can also be advantageous if lubricant-bearing support 6 or one of lubricant intermediate layers 6.1, 6.2, 6.3 can be relubricated from outside.

The oil output to the friction bearing shaft takes place preferably by gap 7. Such gaps 7 are represented in the drawing in various variants of the embodiment. But the contact possibility with the oil-bearing layer is also possible by the end areas of support layer 6 or of support intermediate layers 6.1, 6.2, 6.3 preferably on the front side to the axis of rotation, as this is represented in FIG. 12 and 14.

For better demoldability of the friction bearing on core 1 before the application of sliding layer 4, it is advantageous to provide a separating layer 21 (FIG. 4). This separating layer 21 can be a separating agent known in the art, for example based on wax or silicone or a vapor-deposited layer of a suitable metal carbide or metal nitride, such as titanium carbide (TIC) or titanium nitride (TIN).

FIG. 15 shows a partial cross section through a friction bearing 8, produced according to the invention, with one or with several continuous separating slots 7 in sliding layer 4. Separating slot(s) 7 is or are completely filled with the material of support 6 or of the innermost layer of several support layers. The shrinkage forces indicated with arrows P illustrate the forces in effect of the material of support 6 or several support layers, optionally present, on sliding layer 4. After the cooling of support 6 in the dimensionally stable state in separating slot(s) 7, a change of the inside diameter of sliding layer 4 by additional shrinkage forces of the material of support 6 is no longer possible. Thus, when using only a single core 1, friction beatings 8 with maximum precision, i.e., with very narrow tolerances of the inside diameter of sliding layer 4 in the range $\leq 60$ μm, are obtained.

In this embodiment of this invention, the material of support 6 or of the innermost layer of several support layers, optionally present, centers and calibrates the width of gap(s) 7 and thus the inside diameter of sliding layer 4. The width of gap or gaps 7 is preferably between 0.3 mm and 3.0 mm.

FIG. 16 shows a partial cross section of an embodiment variant of a friction beating 8 produced according to the invention. In this embodiment, sliding layer 4 is not provided with continuous separating slots, but only with one or with several separating seam(s) 7a, which is or are filled again with the material of support 6 or with the material of one of the support layers.

Web(s) 23 remaining on separating seam(s) 7a is or are designed as webbing 24. The thickness of this webbing or these webbings 24 is less than one millimeter, preferably less than 0.5 min. As a result, one or several expansion joint(s) is or are provided, with which the inside diameter of sliding layer 4 can be correspondingly adjusted corresponding to the outside diameter of a second core 1a. In the production of support 6 or of the innermost layer of several support layers, this or these separating seam(s) 7a is or are filled with the material of support 6 or of corresponding support layers, so that also in this case, the material of support 6 or of the support layers is used for calibration and centering, so that after the cooling of support 6 or of the innermost support layer in the dimensionally stable state, a change of the inside diameter of sliding layer 4 is no longer possible.

Also in this variant of the embodiment of this invention, separating seam 7a or separating seams 7a can run inclined to axis of rotation R of the shaft whose bearings are to be arranged, especially at an angle between 5° and 30°.

Even if two cores 1, 1a with different core diameters were required in these variants of the embodiment of this invention, in which core diameter 1a can be smaller than or larger than core diameter 1, this embodiment is distinguished by the additional advantages that the filler-reinforced material of support 6 or of possibly several support layers does not engage with the shaft and that the thickness of webbing or webbings 24 remaining after prolonged use can be used as an indication of wear. Since the material of sliding layer 4 and that of support 6 consist not only of different polymers, but preferably also of different colors, the transparency of the material of support 6 through webbing or webbings 24 or its exposure after the wear of webbing or webbings 24 can be used as an indication of wear.

In the production of sliding layer 4 made of mainly thermoplastic materials, it can be advantageous to cool core 1 greatly to extremely greatly. For example, liquid nitrogen can be used for cooling. By the cooling, especially by an extreme cooling of, for example, under −100° C., the molecular structure of the material used for sliding layer 4 can be influenced advantageously. For example, as a result, a structure that is more crystalline and thus of a higher stability under load is obtained. But this can be at the expense of the integral action with the support material, so that in this case, an especially good positive connection between sliding layer 4 and support 6 should be sought.

In the production of sliding layer 4 from mainly thermosetting materials, core 1 can be greatly heated, for example, in a temperature range of up to 200° C.

In this application, hard polymers are understood to be polymers in the Shore D range with degrees of hardness of 30 to 90 Shore D.

In this application, flexible polymers are understood to be polymers in the Shore A range with degrees of hardness of 40 to 98 Shore A.

Sleeve-shaped friction bearing 8 produced according to the process of the invention has a sliding layer 4 made of one of the polymeric materials polyethersulfone, polyetherketone, polyamide imide or polyetherimide, in which sliding layer 4 preferably consists of a layer thickness of about 0.2 mm up to about 3 mm.

Sliding layer 4 is advantageously surrounded by a support 6 made of hard polymeric material. But sliding layer 4 can also be surrounded by a support 6 made of flexible polymeric material.

Sliding layer 4 is especially advantageously surrounded by at least two support intermediate layers 6.1, 6.2 or 6.1, 6.2, 6.3, alternately applied over one another, made of alternately hard or flexible polymers.

Thus designed sleeve-shaped friction beatings 8 are distinguished in that the support material can assume the object compensating for or taking care of installation tolerances and dimensional bridgings based on the unusually thin wall thickness of sliding layer 4. When using elastic support materials, bearing oscillations can be reduced. In addition, axial misalignments are balanced by the elasticity of the flexible support material.

I claim:

1. Process for the production of a sleeve-shaped friction bearing having a longitudinal axis of rotation and with an inner sliding surface facing toward the axis of rotation, a thin, inner sliding layer made of a polymeric material having good sliding properties, and a support surrounding said sliding layer which is made of a polymeric material, the sliding layer having a depression which faces toward the support, and which is filled with the material of which the support is made, comprising the process steps of:

A) producing the thin, inner sliding layer a first polymeric material that is free of abrasive fillers on a core by a molding process;

B) producing at least one longitudinal interruption in an outer surface of the sliding layer which extends from a first axial end to an opposite axial end of the inner sliding layer with said at least one longitudinal interruption in the outer surface of the sliding layer only partial separating the sliding layer with an underlying web connecting portions of said sliding layer at opposite sides of said longitudinal interruption;

C) sheathing the inner sliding layer with an outside support made of a second polymeric material while said inner sliding layer is on said core and joining the inner sliding layer with the outside support in a manner filling said longitudinal interruption with the second polymeric material of the outside support so as to dimensionally stabilize the sliding layer; and D) pushing the sheathed and dimensionally stabilized sliding layer off of said core and then discarding the core.

2. Process according to claim 1, wherein said at least one longitudinal interruption in the outer surface of the sliding layer only partial separates the sliding layer with an underlying web connecting portions of said sliding layer at opposite sides of said longitudinal interruption.

3. Process according to claim 1, wherein the thickness of said web is less than one millimeter.

4. Process according to claim 1, wherein said at least one longitudinal interruption in the outer surface of the sliding layer is arranged at an acute angle to the axis of rotation.

5. Process according to claim 1 wherein said outside support is made of at least two layers of alternating hard and flexible polymeric materials joined one over another.

6. Process according to claim 5, wherein the material of which at least the hard layer of said outside support is made is comprised of about 5% to 80% of at least one material selected from the group consisting of fibrous, particle-shaped, spherical mineral, organic, and inorganic fillers.

7. Process according to claim 5, wherein an innermost of said at least two layers and an outermost of said at least two layers of said outside support are produced of said hard polymeric material.

8. Process according to claim 5, wherein an innermost layer of said at least two layers and an outermost layer of said at least two layers of said outside support are produced of said flexible polymeric material.

9. Process according to claim 1, wherein connecting formations are provided on or in the outer surface of the inner sliding layer.

10. Process according to claim 1, wherein the inner sliding layer is deformed by said outer support.

11. Process according to claim 1, wherein on at least one axial end of the inner sliding layer, a molded-on flange is provided which is directed radially outward.

12. Process according to claim 1, wherein the outer support and the inner sliding layer end flush with one another at least on one axial end thereof.

13. Process according to claim 1, wherein the second polymeric material of said outside support is comprised of about 5% to 80% of at least one material selected from the group consisting of fibrous, particle-shaped, spherical mineral, organic, and inorganic fillers.

14. Process according to claim 1, wherein said second polymeric material is a lubricant-containing or lubricant-bearing polymeric material, and wherein said outside support coaxially surrounds said inner sliding layer in at least partial direct contact with the outer surface of the inner sliding layer.

15. Process according to claim 14, wherein the outside support is relubricatable from the outside thereof.

16. Process for the production of a sleeve-shaped friction bearing having a longitudinal axis of rotation and with an inner sliding surface facing toward the axis of rotation, a thin, inner sliding layer made of a polymeric material having good sliding properties, and a support surrounding said sliding layer which is made of a polymeric material, the sliding layer having a depression which faces toward the support and which is filled with the material of which the support is made, comprising the process steps of:

A) producing the thin, inner sliding layer a first polymeric material that is free of abrasive fillers on a core by a molding process;

B) producing at least one longitudinal interruption in an outer surface of the sliding layer which extends from a first axial end to an opposite axial end of the inner sliding layer;

C) sheathing the inner sliding layer with a cylindrical outside support made of made of at least two layers of alternating hard and flexible polymeric materials joined one over another while said inner sliding layer is on said core and joining the inner sliding layer with the outside support in a manner filling said longitudinal interruption with the the material one of said at least two layers of the outside support so as to dimensionally stabilize the sliding layer; and D) pushing the sheathed and dimensionally stabilized sliding layer off of said core and then discarding the core.

* * * * *